J. J. MILLER.
Evaporating Pan.
No. 37,258.
Patented Dec. 23, 1862.
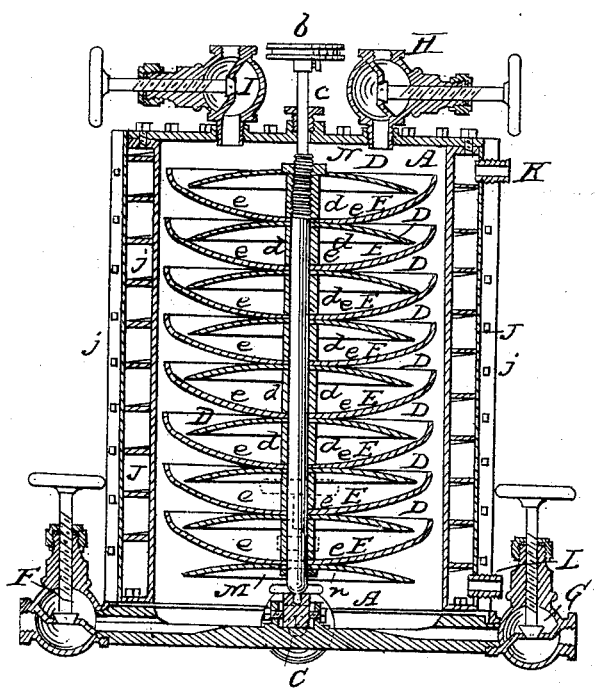
WITNESSES:
INVENTOR:

UNITED STATES PATENT OFFICE.

JOHN JACOB MILLER, OF CHICAGO, ILLINOIS, ASSIGNOR TO HIMSELF AND ERNST PRUSSING, OF SAME PLACE.

IMPROVED APPARATUS FOR CONDENSING AND EVAPORATING.

Specification forming part of Letters Patent No. 37,258, dated December 23, 1862.

*To all whom it may concern:*

Be it known that I, JOHN JACOB MILLER, of Chicago, in the county of Cook and State of Illinois, have invented a new and useful Improvement in Apparatus for Condensing, Evaporating, or Cooling Fluids; and I do hereby declare the following to be a full and exact description of the same, reference being had to the accompanying drawing, making part of this specification, and being a vertical section of an apparatus illustrating my invention.

The subject of my said invention is an apparatus consisting of a series of dishes or pans placed in alternately-reversed positions upon a revolving shaft within a close vessel, on the exterior of which may be placed, when needful, a jacket or coil for the reception and circulation of a heating or cooling medium.

To enable others skilled in the art to which my invention appertains to fully understand and use the same, I will proceed to describe its construction and operation.

A is a tight vessel adapted to resist a heavy internal or external pressure.

B is a vertical shaft resting in a step, C, and passing out at top through a stuffing-box, $c$.

D E are a series of pans, of unequal size, secured to the shaft B in alternately-reversed positions, the margins of the inverted pans D being within the margins of the pans E, as clearly shown in the drawing.

$e$ $e$ are apertures in the bottoms of the pans E, for the passage of liquids, as hereinafter described.

$d$ $d$ $d$ are short tubes placed upon the shaft B, between the pans D and E, to keep them the required distance apart.

M is a collar secured to the shaft B by means of a set-screw, $m$.

N is a nut, either attached to or placed above the upper pan, D, and threaded upon the shaft B, near the upper end of the latter. The pans are clamped between the nut N and collar M, so as to be made to rotate with the shaft B; but the attachment is such as to permit the ready removal and separation of all the pans and tubes for cleansing purposes.

F G H I are ingress or egress cocks or valves, the use of which will be presently explained.

J is a spiral coil or jacket, which for some purposes may be placed around the vessel A. The casing of the said jacket may be formed in two parts, held together by flanges and bolts, as shown at $j$.

K L are ingress and egress apertures to the coil or jacket J.

The rotation of the shaft B and pans D E may be effected by a pulley, $b$, or in any other suitable manner.

For the purposes of a condenser the apparatus is used as follows: A rotary motion is imparted to the shaft B, carrying with it the pans D E. Steam is introduced through the cock F, the cock I being opened in first using the apparatus for ventage, to permit the entrance of steam within the condensing-chamber A. The cock I is then closed and condensing-water injected through the cock H, which water, falling upon the upper inverted pan D, is thereby distributed over the surface of the upper one of the pans E. Flowing inward toward the center, it falls through the apertures $e$ $e$ upon the second of the pans D, spreading over the surface of the same, and is again, by centrifugal action, thrown off in a shower into the second of the pans E, and so on throughout the series. It will be seen that the steam permeating the entire interior of the chamber is cooled by contact with the under surface of all the pans, over the upper surface of which water is flowing, and also by direct contact with the water upon the upper surfaces of the pans, and still more minutely as it falls in repeated showers from pan to pan. The exposure of the steam to so extended a cooling-surface of both water and metal results in its rapid and economical condensation. Water of condensation is drawn off through the cock G.

The manner of using the apparatus for the purpose of an evaporator is as follows: The air is extracted through the cock I by means of an air pump or fan, and a partial vacuum maintained within the chamber A. The pans are rotated, as before, and liquid to be evaporated is introduced through the cock H, which liquid is, by reason of the form and rotation of the pans, distributed over their entire surface and delivered in repeated showers from pan to pan, as previously explained in the case of the condensing-water. A high temperature is maintained within the chamber A by means of steam introduced at K, and passing throughout the coil J to the exit-port L, which, with the minute separation and diffusion of the liquid, effects the rapid evaporation of the latter. After having undergone the necessary evaporation, the liquid is drawn off through the cock G. The cock F may be used to draw off any excess of liquid in case of the pump injecting a larger quantity than the apparatus can operate upon to advantage; or the said cock may be used in addition to the cock G, or dispensed with entirely.

For the purpose of cooling liquors, the apparatus is used in a manner similar to that last described, excepting that a cooling instead of a heating fluid is passed through the coil J.

I do not confine myself to any specific construction, number, or location of the induction and eduction ports, nor to the number or precise form of the pans D, or to any specific means of rotating the same. The centrifugal action is only applied in order to distribute the liquid equally over the plates, and must not be so strong as to overcome the weight of the liquid or interfere with its passage through the apertures in the concave pans.

In case of the evaporator being used in saline-works, the plates or pans will be made of wood, glass, or other material not subject to corrosion.

Having thus described my invention, what I claim therein as new, and desire to secure by Letters Patent, is—

1. The combination of the closed vessel A and alternately concave and convex rotating pans D and E, with suitable induction and eduction ports, the whole being arranged to operate substantially as and for the purposes set forth.

2. The combination of the surrounding jacket or coil J with the said closed vessel and pans, substantially as and for the objects specified.

3. Securing the pans D and E upon the shaft B by means of the collar M, tubes $d$, and clamping-nut N, substantially as and for the purposes described.

JOHN JACOB MILLER.

Witnesses:
 JOHN G. SHORTALL,
 ELY H. BREYTSPRAAK.